(12) United States Patent
Chen et al.

(10) Patent No.: US 8,315,066 B2
(45) Date of Patent: Nov. 20, 2012

(54) PRINTED CIRCUIT BOARD

(75) Inventors: Yung-Chieh Chen, Tu-Cheng (TW);
Shou-Kuo Hsu, Tu-Cheng (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 197 days.

(21) Appl. No.: 12/982,905

(22) Filed: Dec. 31, 2010

(65) Prior Publication Data

US 2012/0155046 A1 Jun. 21, 2012

(30) Foreign Application Priority Data

Dec. 15, 2010 (TW) .............................. 99143873 A

(51) Int. Cl.
*H05K 7/02* (2006.01)
*H05K 7/06* (2006.01)
*H05K 7/08* (2006.01)
*H05K 7/10* (2006.01)

(52) U.S. Cl. ......... 361/783; 361/763; 361/785; 361/803

(58) Field of Classification Search .......... 361/783–785, 361/803; 439/631–638, 645
See application file for complete search history.

(56) References Cited

U.S. PATENT DOCUMENTS

| | | | | |
|---|---|---|---|---|
| 5,928,036 A | * | 7/1999 | Thrush | 439/631 |
| 6,215,727 B1 | * | 4/2001 | Parson et al. | 365/233.14 |
| 6,971,887 B1 | * | 12/2005 | Trobough | 439/71 |
| 7,416,452 B1 | * | 8/2008 | Sabo | 439/631 |
| 2012/0190219 A1 | * | 7/2012 | Pai et al. | 439/65 |

* cited by examiner

*Primary Examiner* — Tuan T Dinh
(74) *Attorney, Agent, or Firm* — Altis Law Group, Inc.

(57) ABSTRACT

A printed circuit board (PCB) includes a top layer, a memory controller, two gaps, and two connectors. The memory controller is located on the top layer. A number of golden fingers are respectively set on the top layer near each gap and electrically connected to the memory controller. Each connector includes a first slot to hold the gold fingers near a corresponding one of the gaps and a second slot to hold a number of gold fingers of a corresponding one of two memory chips. The first slot is electrically connected to the second slot. Each memory chip and the PCB are coplanar.

4 Claims, 3 Drawing Sheets

PRINTED CIRCUIT BOARD

CROSS-REFERENCE TO RELATED APPLICATION

Relevant subject matter is disclosed in a pending U.S. patent application 12/981,480 having the same title, which is assigned to the same assignee as named herein.

BACKGROUND

1. Technical Field

The present disclosure relates to a printed circuit board (PCB).

2. Description of Related Art

Referring to FIG. 3, on a conventional motherboard 1, a first memory slot 6 and a second memory slot 8, which make up dual-channel memories, are located on a top layer 2 of the motherboard 1. The memory slots 6 and 8 are horizontal slots to reduce the thickness of the motherboard 1 with two memories plugged into the memory slots 6 and 8. However, the memories projects from the motherboard and increases the height occupied by the motherboard 1. In addition, the first memory slot 6 and the second memory slot 8 are set on a side of a memory controller 5. As a result, a distance between the first memory slot 6 and the memory controller 5 is different from a distance between the second memory slot 8 and the memory controller 5. Therefore, the traces between the memory slots 6 and 8 and the memory controller 5 need to be designed at different lengths and according to different rules, making the design process overly-complex.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
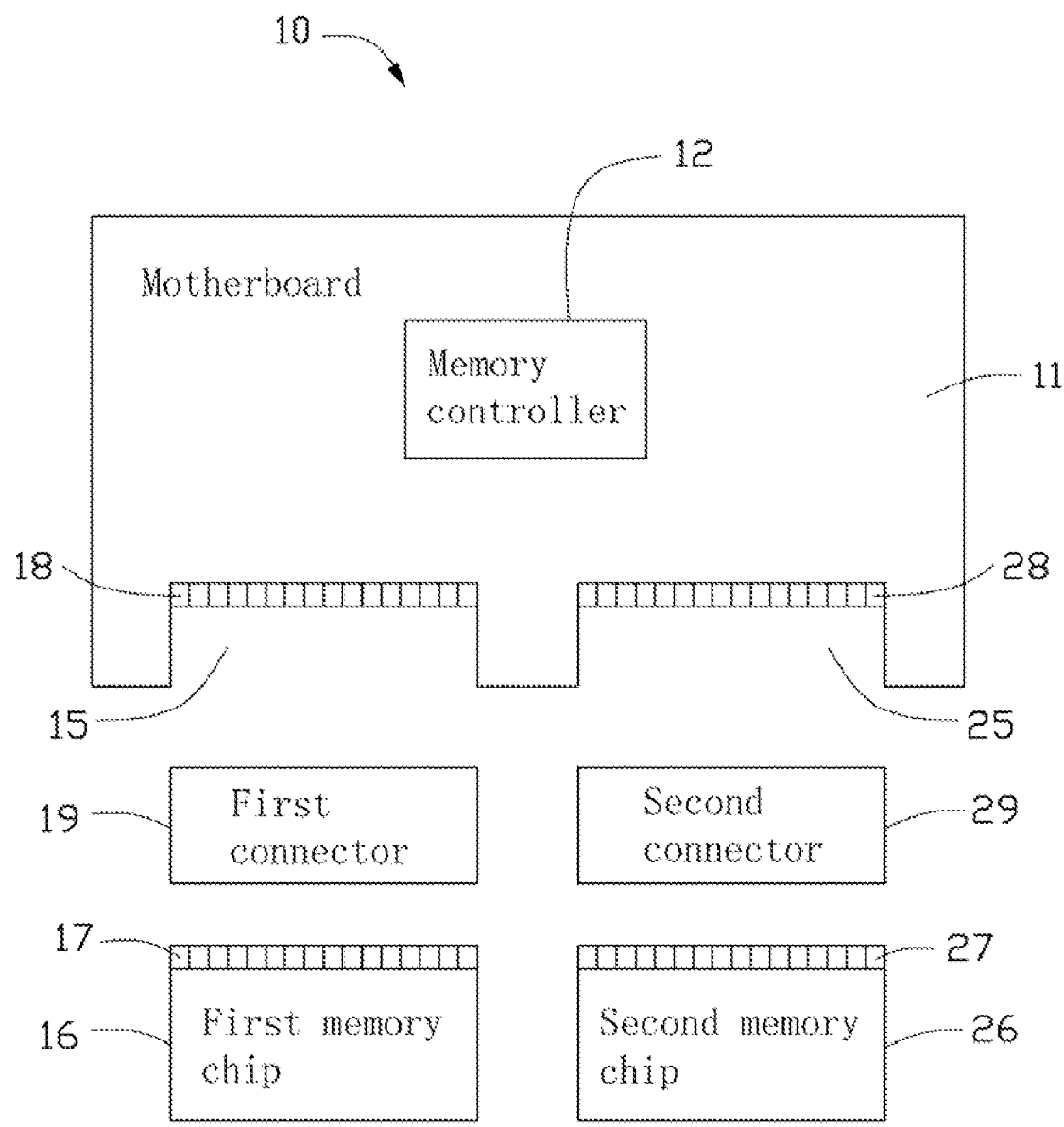
FIG. 1 is a schematic, exploded diagram of an exemplary of a printed circuit board.

Referring to FIG. 1, an exemplary embodiment of a printed circuit board (PCB) includes a top layer 11 and other layers (not shown). A memory controller 12 is located on the top layer 11. In the embodiment, the PCB is a motherboard 10.

The motherboard 10 defines a first gap 15 and a second gap 25 therein through the top layer 11 and the other layers. A length of the first gap 15 is equal to a length of a first memory chip 16. A length of the second gap 25 is equal to a length of a second memory chip 26. A plurality of golden fingers 18 and 28 are set on the top layer 11 of the motherboard 10, respectively near the first gap 15 and the second gap 25. The golden fingers 18 and 28 are electrically connected to the memory controller 12 through traces on the motherboard 10. A distance between the memory controller 12 and the golden fingers 18 is equal to a distance between the memory controller 12 and the golden fingers 28.

Figure 2:
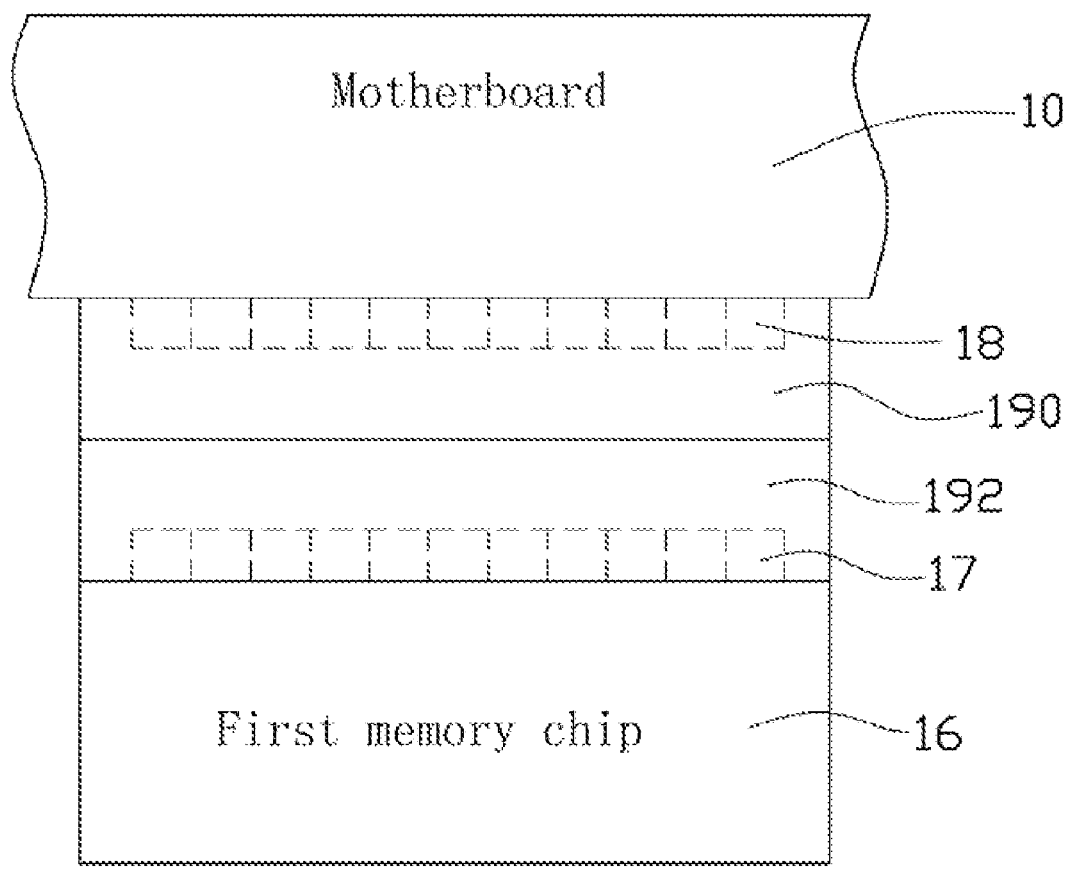
FIG. 2 is an enlarged, schematic diagram of a connector mounted to the printed circuit board of FIG. 1.
Figure 3:
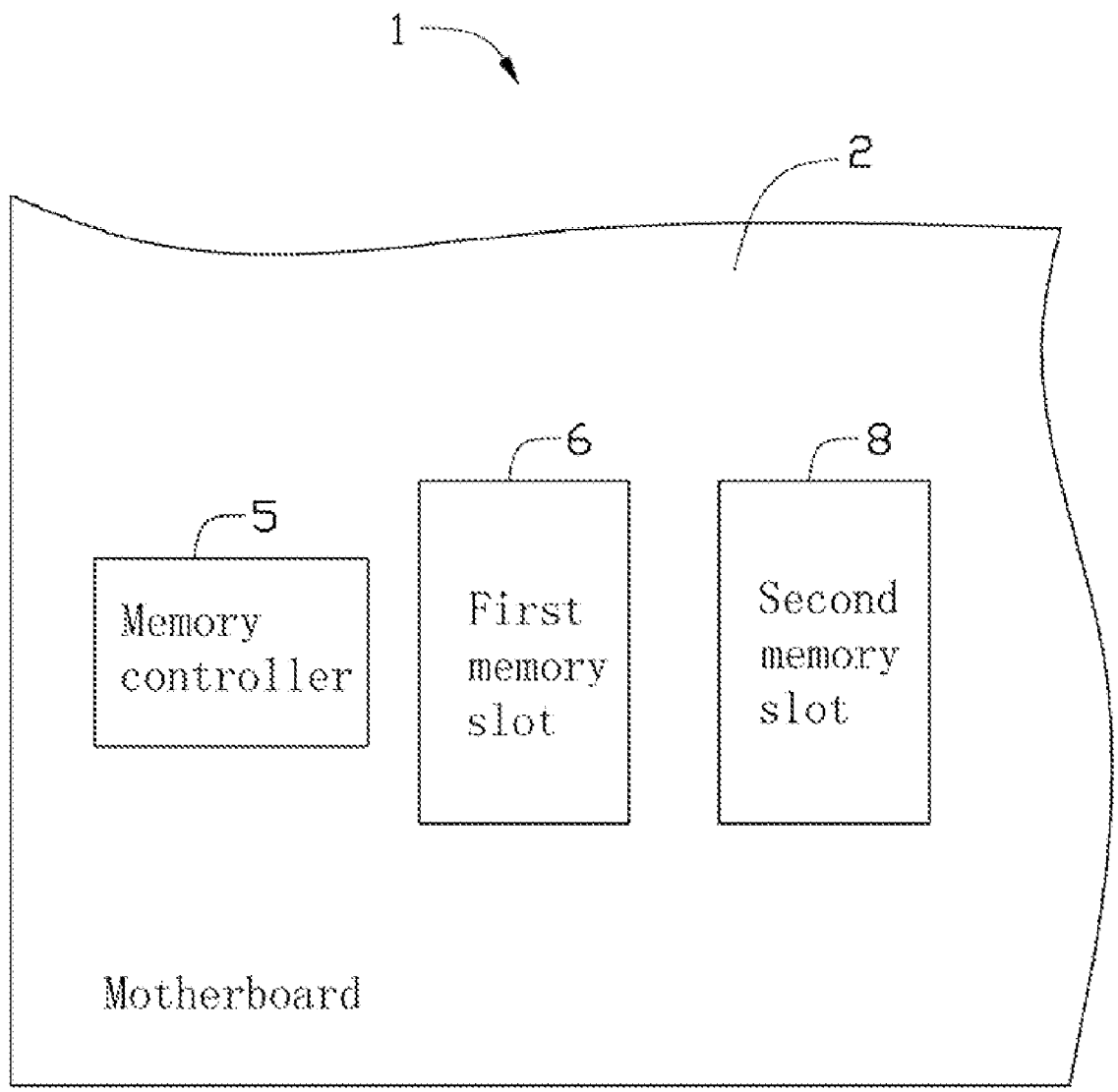
FIG. 3 is a schematic diagram of a conventional motherboard.

Also referring to FIG. 2, in the embodiment, a first connector 19 includes a first memory slot 190 and a second memory slot 192 electrically connected to each other. The first memory slot 190 is configured to hold the golden fingers 18 near the first gap 15. The second memory slot 192 is configured to hold the golden fingers 17 of the first memory chip 16. Because the first memory slot 190 is electrically connected to the second memory slot 192, the memory controller 12 can communicate with the first memory chip 16 through the golden fingers 18 near the first gap 15 and the first connector 19. Moreover, when the first memory chip 16 is plugged into the second memory slot 192, the first memory chip 16 and the motherboard 10 are coplanar.

A first memory slot of a second connector 29 is configured to hold the golden fingers 28 near the second gap 25. A second memory slot of the second connector 29 is configured to hold golden fingers 27 of a second memory chip 26. Moreover, when the second memory chip 26 is plugged into the second memory slot of the second connector 29, the second memory chip 26 and the motherboard 10 are coplanar. As a result, a thickness of the motherboard 10 including the first memory chip 16 and the second memory chip 26 is same with the thickness of the motherboard 10. In addition, the motherboard 10 can install different memories with different capacity. Moreover, the first memory chip 16 and the second memory chip 26 make up dual-channel memories.

Because the distance between the golden fingers 18 near the first gap 15 and the memory controller 12 is equal to the distance between the golden fingers 28 near the second gap 25 and the memory controller 12, traces between the golden fingers 18 and 28, and the memory controller 12 can be designed to be the same length and according to the same rules. In the embodiment, the distance between the golden fingers 18 and the memory controller 12 can be regarded as a distance between a center of the golden fingers 18 and a center of the memory controller 12. The distance between the golden fingers 28 and the memory controller 12 can be regarded as a distance between a center of the golden fingers 28 and the center of the memory controller 12.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A printed circuit board (PCB) comprising:
   a top layer defining a first gap and a second gap extending through the PCB, the top layer comprising a plurality of first golden fingers near the first gap, and a plurality of second golden fingers near the second gap;

a memory controller located on the top layer, and electrically connected to the plurality of first and second golden fingers;

a first connector comprising a first slot to hold the plurality of first golden fingers near the first gap and a second slot to hold a plurality of third golden fingers of a first memory chip, wherein the first slot is electrically connected to the second slot, the first memory chip and the PCB are coplanar; and a second connector comprising a third slot to hold the plurality of second golden fingers near the second gap and a fourth slot to hold a plurality of fourth golden fingers of a second memory chip, wherein the third slot is electrically connected to the fourth slot, the second memory chip and the PCB are coplanar.

2. The PCB of claim 1, wherein a length of the first gap is equal to a length of the first memory chip.

3. The PCB of claim 1, wherein a length of the second gap is equal to a length of the second memory chip.

4. The PCB of claim 1, wherein a distance between the plurality of first golden fingers and the memory controller is equal to a distance between the plurality of second golden fingers and the memory controller.

* * * * *